US010771172B2

(12) United States Patent
Li et al.

(10) Patent No.: US 10,771,172 B2
(45) Date of Patent: Sep. 8, 2020

(54) BASE STATION TEST SYSTEM AND METHOD BASED ON 3D MASSIVE MIMO AND STORAGE MEDIUM

(71) Applicant: RFLIGHT COMMUNICATION ELECTRONIC CO., LTD., Nanjing, Jiangsu (CN)

(72) Inventors: Rongming Li, Jiangsu (CN); Kui Yang, Jiangsu (CN); Bin Zhu, Jiangsu (CN)

(73) Assignee: RFLIGHT COMMUNICATION ELECTRONIC CO., LTD., Nanjing (CN)

(*) Notice: Subject to any disclaimer, the term of this patent is extended or adjusted under 35 U.S.C. 154(b) by 0 days.

(21) Appl. No.: 16/274,216

(22) Filed: Feb. 12, 2019

(65) Prior Publication Data
US 2019/0386760 A1    Dec. 19, 2019

(30) Foreign Application Priority Data

Jun. 19, 2018   (CN) .......................... 2018 1 0631829

(51) Int. Cl.
| H04B 7/0452 | (2017.01) |
| H04B 7/0413 | (2017.01) |
| H04B 17/309 | (2015.01) |
| H04B 17/391 | (2015.01) |
| H04B 7/06 | (2006.01) |
| H04B 17/00 | (2015.01) |
| H04L 27/34 | (2006.01) |

(52) U.S. Cl.
CPC ....... *H04B 17/3912* (2015.01); *H04B 7/0452* (2013.01); *H04B 7/0617* (2013.01); *H04B 17/0085* (2013.01); *H04L 27/34* (2013.01)

(58) Field of Classification Search
None
See application file for complete search history.

(56) References Cited

U.S. PATENT DOCUMENTS 10,033,473 B1 *   7/2018   Kyrolainen .......... H04B 17/391
10,327,213 B1 *   6/2019   Han .................. H04L 25/03343
(Continued)

FOREIGN PATENT DOCUMENTS

| CN | 102480330 | * | 5/2014 |
| CN | 102480330 B | | 5/2014 |

(Continued)

OTHER PUBLICATIONS

Search Report of counterpart European Patent Application No. 19155039.1 dated Aug. 7, 2019.

*Primary Examiner* — Ajit Patel

(57) ABSTRACT

The present invention discloses a base station test system and method based on 3D Massive MIMO and a storage medium, and relates to the technical field of multi-antenna beamforming test in a wireless communication system. Each channel in a phase shift amplitude modulation network can implement the amplitude control and phase control of the channel. The scheme provided by the present invention is to perform air interface channel simulation based on the phase shift amplitude modulation network to satisfy the Massive Multiple Input Multiple Output beamforming/beam tracking (phase synthesis) test verification of a wireless communication base station system.

6 Claims, 9 Drawing Sheets

(56) References Cited

U.S. PATENT DOCUMENTS

| | | | |
|---|---|---|---|
| 2017/0180175 A1* | 6/2017 | Kong | H04B 7/0413 |
| 2017/0223559 A1* | 8/2017 | Kong | H04B 7/0413 |
| 2017/0359739 A1* | 12/2017 | Reed | H04B 17/15 |
| 2018/0026765 A1* | 1/2018 | Brent | H04B 7/04 370/329 |
| 2018/0337738 A1* | 11/2018 | Wen | H04B 17/0087 |
| 2019/0074913 A1* | 3/2019 | Liang | H04B 17/0087 |
| 2019/0115667 A1* | 4/2019 | Liang | H01Q 1/246 |
| 2019/0115989 A1* | 4/2019 | Rodriguez-Herrera | H04B 17/391 |
| 2020/0014476 A1* | 1/2020 | Xue | H04W 16/18 |
| 2020/0036421 A1* | 1/2020 | Su | H04B 7/0452 |

FOREIGN PATENT DOCUMENTS

| | | |
|---|---|---|
| CN | 206743260 | * 12/2017 |
| CN | 206743260 U | 12/2017 |
| CN | 105281818 B | 5/2018 |

\* cited by examiner

BASE STATION TEST SYSTEM AND METHOD BASED ON 3D MASSIVE MIMO AND STORAGE MEDIUM

CROSS-REFERENCE TO RELATED APPLICATION

This application claims priority to China Patent Application No. 201810631829.X, filed on Jun. 19, 2018, which is hereby incorporated by reference in its entirety.

TECHNICAL FIELD

The present invention relates to the technical field of multi-antenna beamforming test in a wireless communication base station, and more particularly relates to a base station test system and method based on 3D Massive Multiple Input Multiple Output (MIMO) and storage medium.

BACKGROUND ART

A wireless communication base station has evolved from 2 antennas to 8 antennas, to now 64 antennas, and even 128 antennas. Massive MIMO is the core technology of 5G. In order to simulate and verify the performance of a beamforming technology, a test scheme is required for implementing Massive MIMO, beamforming and beam tracking.

At present, a 3D Massive MIMO enhanced performance verification test for a wireless communication base station can only be implemented in a far field darkroom, but due to the high cost of the far field darkroom, it is difficult to achieve product line testing; especially for performance verification of 5G Massive MIMO antenna array base station multi-channel beam synthesis, there is no suitable system solution in the industry.

SUMMARY OF THE INVENTION

The present invention provides a base station test system and method based on 3D Massive MIMO and a storage medium for the existing problems, which satisfy a 4.5G/5G multi-channel wireless base station 3D Massive MIMO enhanced performance test scheme to satisfy the beamforming/beam tracking (phase synthesis) test verification for a Massive antenna array of a communication system.

To achieve the foregoing objective, the present invention provides a base station test system based on 3D Massive MIMO, including a phase shift amplitude modulation network provided with M×N independent channels, M 3D MIMO base stations, N user terminals and a data processing device, wherein an input end of the phase shift amplitude modulation network is connected to the M 3D MIMO base stations, an output end of the phase shift amplitude modulation network is connected to the N user terminals, and the phase shift and amplitude of each independent channel in the phase shift amplitude modulation network are independently controllable.

The data processing device is configured to acquire a phase shift variation and an amplitude variation of each independent channel of the phase shift amplitude modulation network according to a positional relationship between a user terminal and an antenna vibration source beam propagation direction, and verify a base station beam performance according to the phase shift variation and the amplitude variation.

Preferably, the phase shift amplitude modulation network provided with M×N independent channels includes: a plurality of power dividers, a plurality of digital step attenuators and a plurality of phase shifters.

The input end of the phase shift amplitude modulation network is internally provided with M power dividers for dividing input signals, the output end of the phase shift amplitude modulation network is internally provided with N power dividers for synthesizing output signals, M×N independent channels are formed between the power divider of the input end and the power divider of the output end, and each independent channel is connected in series with a digital step attenuator for controlling the amplitude of the channel and a phase shifter for controlling the phase of the channel.

Preferably, the data processing device includes a setting unit, a distance difference acquiring unit, a phase difference acquiring unit, and a synthesis unit.

The setting unit is configured to set a positional relationship between a user terminal and an antenna vibration source beam propagation direction.

The distance difference acquiring unit is configured to respectively determine a distance difference between various rows and columns of antenna vibration source radiation beams according to the positional relationship.

The phase difference acquiring unit is configured to respectively determine, according to the positional relationship, a phase difference between an $N^{th}$ vibration source and each column of antenna reference vibration source radiation beams and a phase difference between an $M^{th}$ vibration source and each column of antenna reference vibration source radiation beams.

The synthesis unit is configured to synthesize the phase differences acquired by the phase difference acquiring unit.

Preferably, the positional relationship between a user terminal and an antenna vibration source beam includes: a horizontal angle and a vertical angle between the user terminal and the antenna vibration source beam propagation direction.

Preferably, the operation of respectively determining a distance difference between various rows and columns of antenna vibration source radiation beams according to the positional relationship specifically includes: obtaining a distance difference between M rows of antenna vibration source radiation beams according to the horizontal angle between the user terminal and the antenna vibration source beam propagation direction, and obtaining a distance difference between N columns of antenna vibration source radiation beams according to the vertical angle between the user terminal and the antenna vibration source beam propagation direction.

Preferably, the operation of respectively determining, according to the positional relationship, a phase difference between an $N^{th}$ vibration source and each column of antenna reference vibration source radiation beams and a phase difference between an $M^{th}$ vibration source and each column of antenna reference vibration source radiation beams specifically includes: obtaining a phase difference between an $N^{th}$ vibration source and each column of antenna reference vibration source radiation beams according to the horizontal angle between the user terminal and the antenna vibration source beam propagation direction, and obtaining a phase difference between an $M^{th}$ vibration source and each column of antenna reference vibration source radiation beams according to the vertical angle between the user terminal and the antenna vibration source beam propagation direction.

Preferably, the operation of synthesizing the phase differences acquired by the phase difference acquiring unit specifically includes: synthesizing the phase differences acquired by the phase difference acquiring unit to obtain a synthesized phase difference between an $M^{th}$ row and an $N^{th}$ column of vibration source and a reference vibration source radiation beam, that is, to obtain the phase shift and amplitude of each independent channel in the phase shift amplitude modulation network.

The present invention provides a base station test method based on 3D Massive MIMO, including the steps of:

S10: setting a positional relationship between a user terminal and an antenna vibration source beam propagation direction;

S20: respectively determining a distance difference between various rows and columns of antenna vibration source radiation beams according to the positional relationship;

S30: respectively determining, according to the positional relationship, a phase difference between an $N^{th}$ vibration source and each column of antenna reference vibration source radiation beams and a phase difference between an $M^{th}$ vibration source and each column of antenna reference vibration source radiation beams;

S40: synthesizing the determined phase differences; and

S50: verifying the performance of a base station beam.

Preferably, step S10 of setting a positional relationship between a user terminal and an antenna vibration source beam propagation direction specifically includes: setting a horizontal angle and a vertical angle between the user terminal and the antenna vibration source beam propagation direction.

Preferably, step S20 of respectively determining a distance difference between various rows and columns of antenna vibration source radiation beams according to the positional relationship specifically includes:

S201: obtaining a distance difference between M rows of antenna vibration source radiation beams according to the horizontal angle between the user terminal and the antenna vibration source beam propagation direction; and S202: obtaining a distance difference between N columns of antenna vibration source radiation beams according to the vertical angle between the user terminal and the antenna vibration source beam propagation direction.

Preferably, step S30 of respectively determining, according to the positional relationship, a phase difference between an $N^{th}$ vibration source and each column of antenna reference vibration source radiation beams and a phase difference between an $M^{th}$ vibration source and each column of antenna reference vibration source radiation beams specifically includes:

S301: obtaining a phase difference between an $N^{th}$ vibration source and each column of antenna reference vibration source radiation beams according to the horizontal angle between the user terminal and the antenna vibration source beam propagation direction; and S302: obtaining a phase difference between an $M^{th}$ vibration source and each column of antenna reference vibration source radiation beams according to the vertical angle between the user terminal and the antenna vibration source beam propagation direction.

Preferably, step S40 of synthesizing the determined phase differences specifically includes:

S401: synthesizing the phase differences acquired by a phase difference acquiring unit;

S402: obtaining a synthesized phase difference between an $M^{th}$ row and an $N^{th}$ column of vibration source and a reference vibration source radiation beam; and S403: obtaining the phase shift and amplitude of each independent channel in a phase shift amplitude modulation network.

Preferably, step S50 of verifying the performance of a base station beam specifically includes: verifying the performance of a base station beam according to a calculated terminal user 3D orientation result.

The present invention also provides a computer-readable storage medium, storing an application program of a base station test method based on 3D Massive MIMO, the application program implementing the steps of the base station test method based on 3D Massive MIMO according to any one of claims 8 to 14.

Compared with the prior art, the present invention provides a base station test system and method based on 3D Massive MIMO and a storage medium. The present invention simulates the 3D Massive MIMO characteristics of a far field air interface channel based on a phase shift amplitude modulation matrix network, thereby implementing a conduction test simulation air interface test scheme. The used phase shift amplitude modulation matrix network includes M power dividers of an input end and N power dividers of an output end. Each power divider of the input end divides input signal energy into N paths, and each power divider of the output end combines M paths of signal energy as one path for output, where both M and N are integers greater than 1. Each of M*N channels between the M power dividers of the input end and the N power dividers of the output end is sequentially connected with a digital step attenuator for implementing the amplitude control of the channel and a phase shifter for implementing the phase change of the channel. The scheme provided by the invention enables the amplitude and phase of signals on the M*N channels to be independently controllable by controlling the phase shifter and the digital step attenuator based on the phase shift amplitude modulation matrix network to satisfy the Massive MIMO beamforming/beam tracking (phase synthesis) test verification of a wireless communication base station system.

The present invention has the following beneficial effects:

1. End-to-end wireless performance test for wireless communication terminals and base station equipment is supported.
2. Multi-path fading in wireless channels, MIMO characteristics and field polarization characteristics of beamforming signals can be simulated.
3. Beam directivity after beamforming can be simulated.
4. Movement of mobile devices in the wireless channels can be simulated to simulate beam tracking.
5. Related test verification of a physical layer and an application layer of a wireless communication base station is performed in simulated Massive MIMO, beamforming and beam tracking scenarios (e.g., peak throughput rate, and baseband beamforming algorithm verification).

BRIEF DESCRIPTION OF THE DRAWINGS

In order to more clearly illustrate the technical schemes in embodiments of the present invention or the prior art, the drawings used in the descriptions for the embodiments or the prior art will be briefly described below. Obviously, the drawings in the following descriptions are only some embodiments of the present invention, and those of ordinary skill in the art can obtain other drawings according to the structures shown in the drawings without any creative work.

Figure 1:
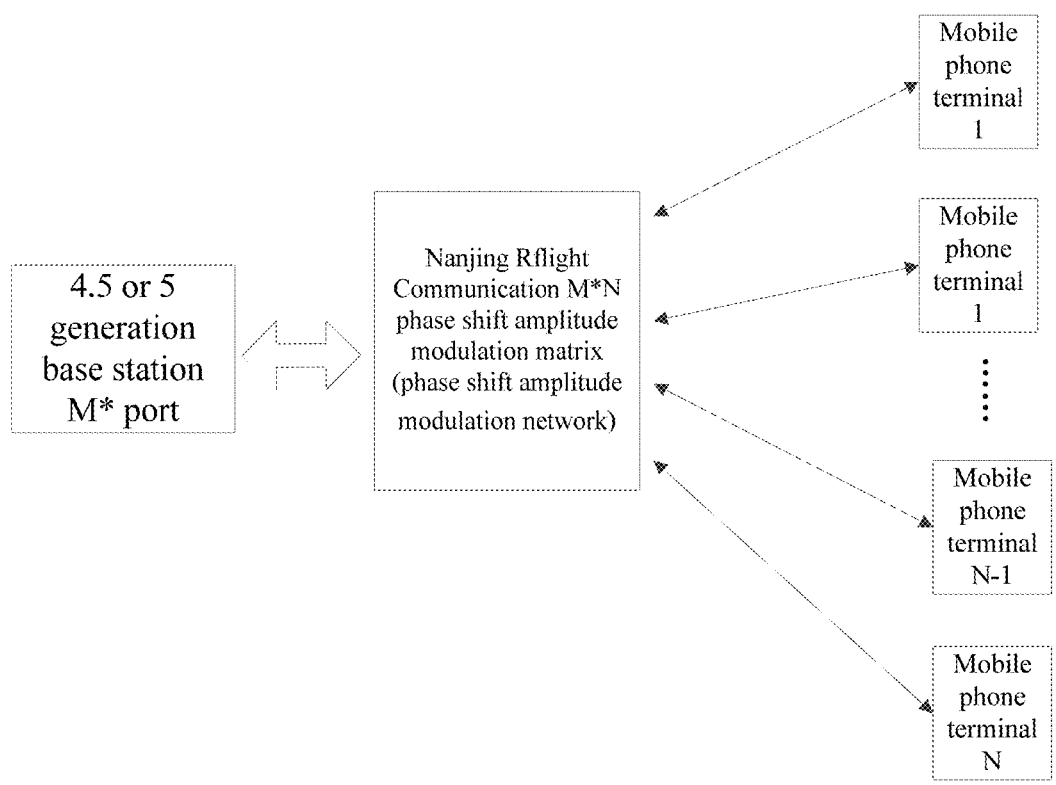
FIG. 1 is a schematic diagram of a basic configuration environment in an embodiment of the present invention.

The implementation, functional features and advantages of the present invention will be further described with reference to the drawings in conjunction with the embodiments.

DETAILED DESCRIPTION OF THE INVENTION

The technical schemes in the embodiments of the present invention are clearly and completely described in the following with reference to the drawings in the embodiments of the present invention. It is obvious that the described embodiments are only a part of the embodiments of the present invention, and not all of the embodiments. All other embodiments obtained by those of ordinary skill in the art based on the embodiments of the present invention without creative efforts fall within the scope of protection of the present invention.

It should be noted that if there is a directional indication (such as up, down, left, right, front, and back) in the embodiments of the present invention, the directional indication is only used to explain in a relative positional relationship between various components a specific posture (as shown in the figures), a motion situation, etc., and if the specific posture changes, the directional indication also changes accordingly.

In addition, if there is a description of "first", "second", etc. involved in the embodiments of the present invention, the description of the "first", "second", etc. is used for the purpose of description only, and is not to be construed as indicating or implying the relative importance or implicitly indicating the number of technical features indicated. Thus, features defining "first" and "second" may include at least one of the features, either explicitly or implicitly. In addition, the technical schemes between various embodiments may be combined with each other, but must be implemented by those of ordinary skill in the art. When the combination of the technical schemes is contradictory or impossible to implement, it should be considered that the combination of the technical schemes does not exist and also goes beyond the scope of protection required by the present invention.

The present invention provides a base station test system based on 3D Massive MIMO.

In a preferred embodiment of the present invention, a phase shift amplitude modulation network (e.g., Nanjing Nat Communication M×N phase shift amplitude modulation matrix) provided with M×N independent channels, M 3D MIMO base stations (e.g., 4.5th or 5th generation base station), N user terminals (mobile phone terminals), and a data processing device. An input end of the phase shift amplitude modulation network is connected to the M 3D MIMO base stations, an output end of the phase shift amplitude modulation network is connected to the N user terminals, and the phase shift and amplitude of each independent channel in the phase shift amplitude modulation network are independently controllable. The data processing device is configured to acquire a phase shift variation and an amplitude variation of each independent channel of the phase shift amplitude modulation network according to a positional relationship between a user terminal and an antenna vibration source beam propagation direction, and verify a base station beam tracking performance according to the phase shift variation and the amplitude variation.

In the embodiments of the present invention, the test content is a performance test of a 3D MIMO base station, which is mainly a performance test of multi-stream beamforming based on multi-user MU-MIMO, and a basic environment configuration required for multiple UE (MU-MIMO) tests is shown in FIG. 1, and N (N is greater than 1) users are taken as an example (a downlink M×N connection and an unlink N×M connection). Note: An intermediate phase shift amplitude modulation matrix network shown in FIG. 1 mainly generates a channel model based on geographic location information required for verifying the beamforming performance. The leftmost side is M unit 3D MIMO base stations to be tested, and the rightmost side is N test terminals.

Figure 2:
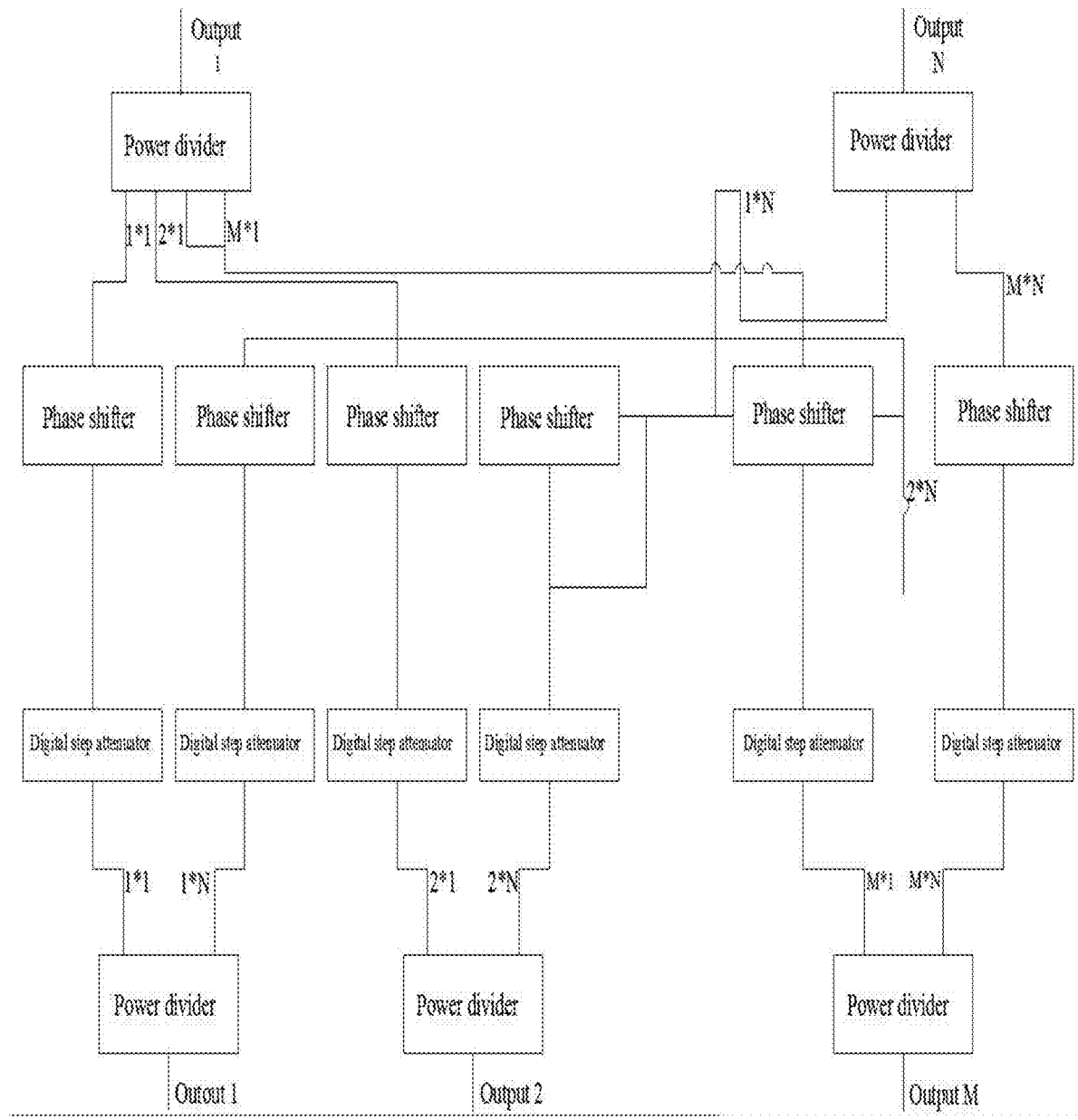
FIG. 2 is a schematic structure diagram of M×N independent channels in an embodiment of the present invention.

In a preferred embodiment of the present invention, as shown in FIG. 2, the phase shift amplitude modulation network provided with M×N independent channels includes: a plurality of power dividers, a plurality of digital step attenuators and a plurality of phase shifters. The digital step attenuator uses pe43705ds (manufacturer: Peregrine), pe43711ds (manufacturer: Peregrine), pe43712ds (manufacturer: Peregrine), pe43713ds (manufacturer: Peregrine), F1956 (manufacturer: IDT), etc. The phase shifter uses pe44820ds (manufacturer: Peregrine), MAPS-010164 (manufacturer: Macom), MAPS-010165 (manufacturer: Macom), TGP2108-SM (manufacturer: Qorvo), HMC649A (manufacturer: ADI), SIP051SP5 (Chengdu SiGen Semiconductor), SIP052SP5 (Chengdu SiGen Semiconductor), SIP050SP5 (Chengdu SiGen Semiconductor), SIP054SP3 (Chengdu SiGen Semiconductor), etc.

In the embodiments of the present invention, the input end of the phase shift amplitude modulation network is internally provided with M power dividers for dividing input signals, the output end of the phase shift amplitude modulation network is internally provided with N power dividers for synthesizing output signals, M×N independent channels are formed between the power divider of the input end and the power divider of the output end, and each independent channel is connected in series with a digital step attenuator for controlling the amplitude of the channel and a phase shifter for controlling the phase of the channel. The power divider of each port of the input end performs power division on a signal incoming from the port into N paths, after the phase shifter and the digital step attenuator perform amplitude modulation and phase modulation, the power divider of the output terminal combines M paths of signals into one path, which are sequentially output from N ports. Each of M*N channels has a digital step attenuator to implement the amplitude control of the channel, thereby achieving a scenario of simulating a fading test. Each of the M*N channels has a phase shifter to implement the phase change of the channel, thereby achieving a simulated scene of beamforming. The phase shift amplitude modulation matrix system controls the phase shifter and the digital step attenuator to enable the amplitude and phase of signals on the M*N channels to be independently controllable, so as to satisfy a test application scenario of beamforming.

Figure 3:
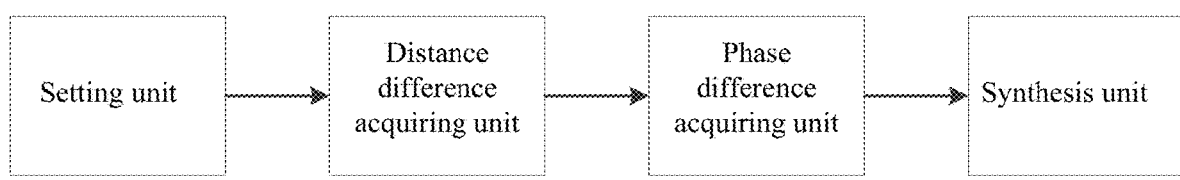
FIG. 3 is a schematic structure diagram of a data processing device in an embodiment of the present invention.

In a preferred embodiment of the present invention, as shown in FIG. 3, the data processing device includes a setting unit, a distance difference acquiring unit, a phase difference acquiring unit, and a synthesis unit.

The setting unit is configured to set a positional relationship between a user terminal and an antenna vibration source beam, specifically including: a horizontal angle θ and a vertical angle θ between the user terminal and the antenna vibration source beam propagation direction.

Figure 4:
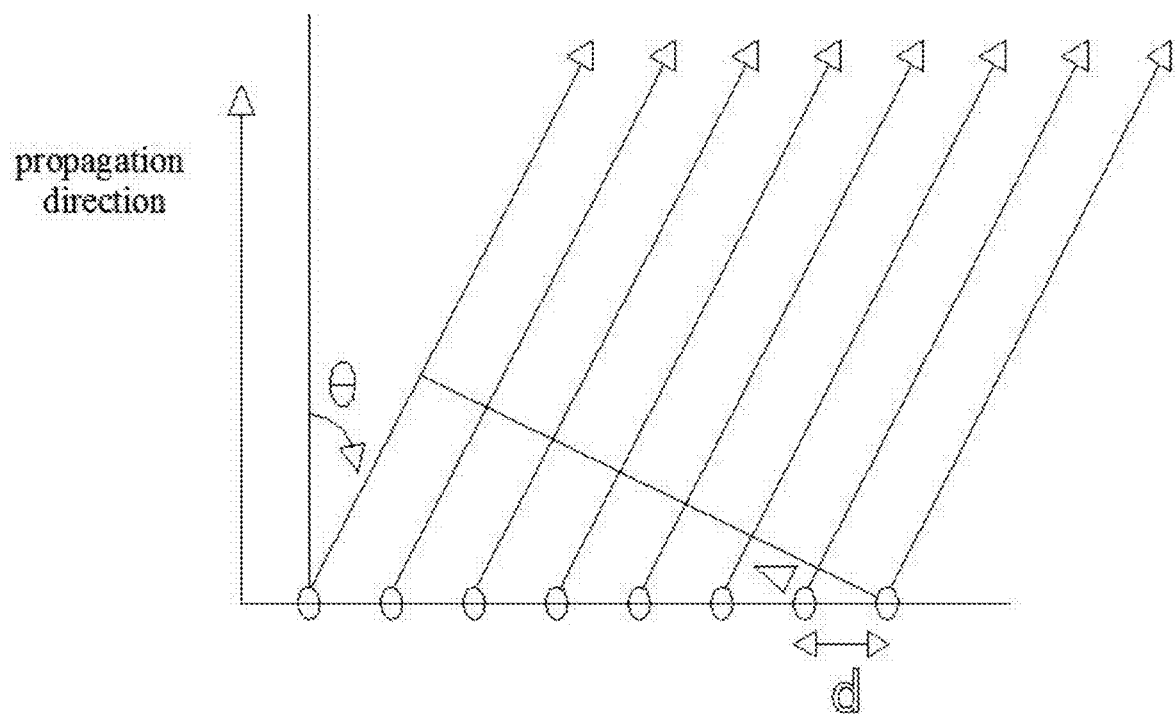
FIG. 4 is a schematic radiation diagram of antenna point vibration source beams linearly arranged in an embodiment of the present invention.
Figure 5:
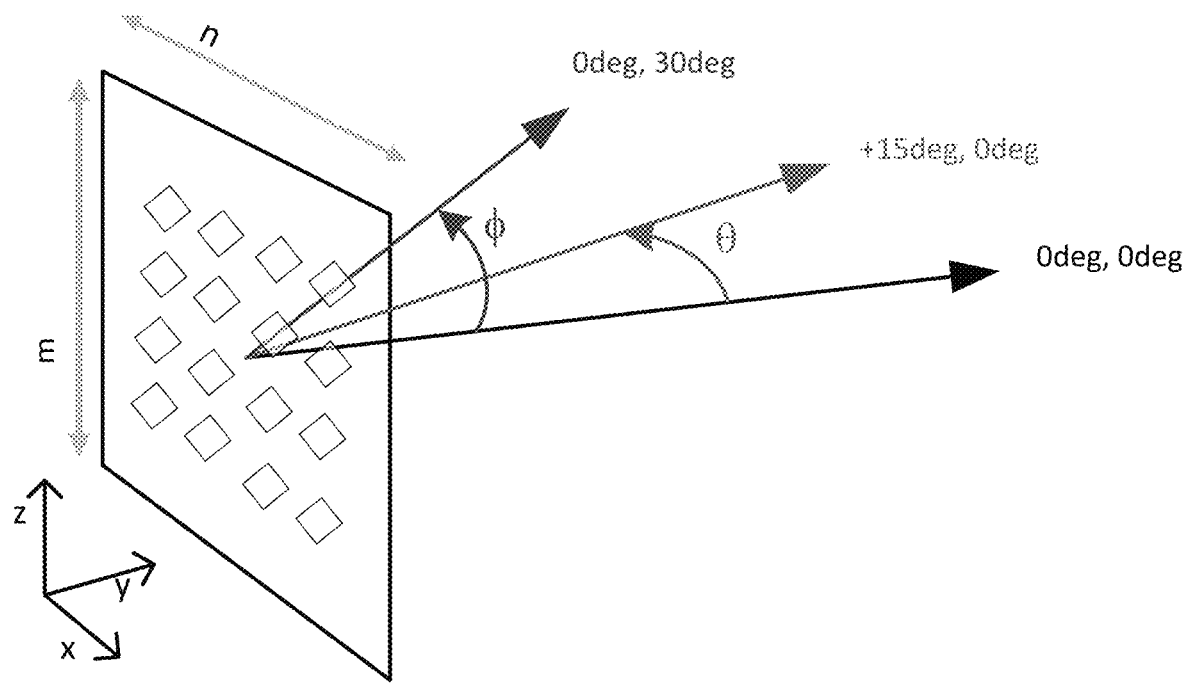
FIG. 5 is a schematic radiation diagram of antenna plane array beams in an embodiment of the present invention.

In the embodiments of the present invention, as shown in FIG. 4, an arrow indicates a far field (propagation beam), based on location information of the terminal (an angle θ with a horizontal propagation direction, an angle φ perpendicular to the propagation direction and Z-axis distance information), and according to a principle and beamforming algorithm shown in FIG. 4 and FIG. 5, the corresponding beam directivity operation can be implemented, thereby implementing a Massive MIMO enhanced performance test scheme of a 4.5G/5G wireless communication base station.

The distance difference acquiring unit is configured to respectively determine a distance difference between various rows and columns of antenna vibration source radiation beams according to the positional relationship. The operation specifically includes: obtaining a distance difference between M rows of antenna vibration source radiation beams according to the horizontal angle θ between the user terminal and the antenna vibration source beam propagation direction, and obtaining a distance difference between N columns of antenna vibration source radiation beams according to the vertical angle θ between the user terminal and the antenna vibration source beam propagation direction.

The phase difference acquiring unit is configured to respectively determine, according to the positional relationship, a phase difference between an $N^{th}$ vibration source and each column of antenna reference vibration source radiation beams and a phase difference between an $M^{th}$ vibration source and each column of antenna reference vibration source radiation beams. The operation specifically includes: obtaining a phase difference between an $N^{th}$ vibration source and each column of antenna reference vibration source radiation beams according to the horizontal angle θ between the user terminal and the antenna vibration source beam propagation direction, and obtaining a phase difference between an $M^{th}$ vibration source and each column of antenna reference vibration source radiation beams according to the vertical angle θ between the user terminal and the antenna vibration source beam propagation direction.

The synthesis unit is configured to synthesize the phase differences acquired by the phase difference acquiring unit. The operation specifically includes: synthesizing the phase differences acquired by the phase difference acquiring unit, and weighing to obtain a synthesized phase difference between an $M^{th}$ row and an $N^{th}$ column of vibration source and a reference vibration source radiation beam, that is, to obtain the phase shift and amplitude of each independent channel in the phase shift amplitude modulation network.

The present invention provides a base station test method based on 3D Massive MIMO.

Figure 6:
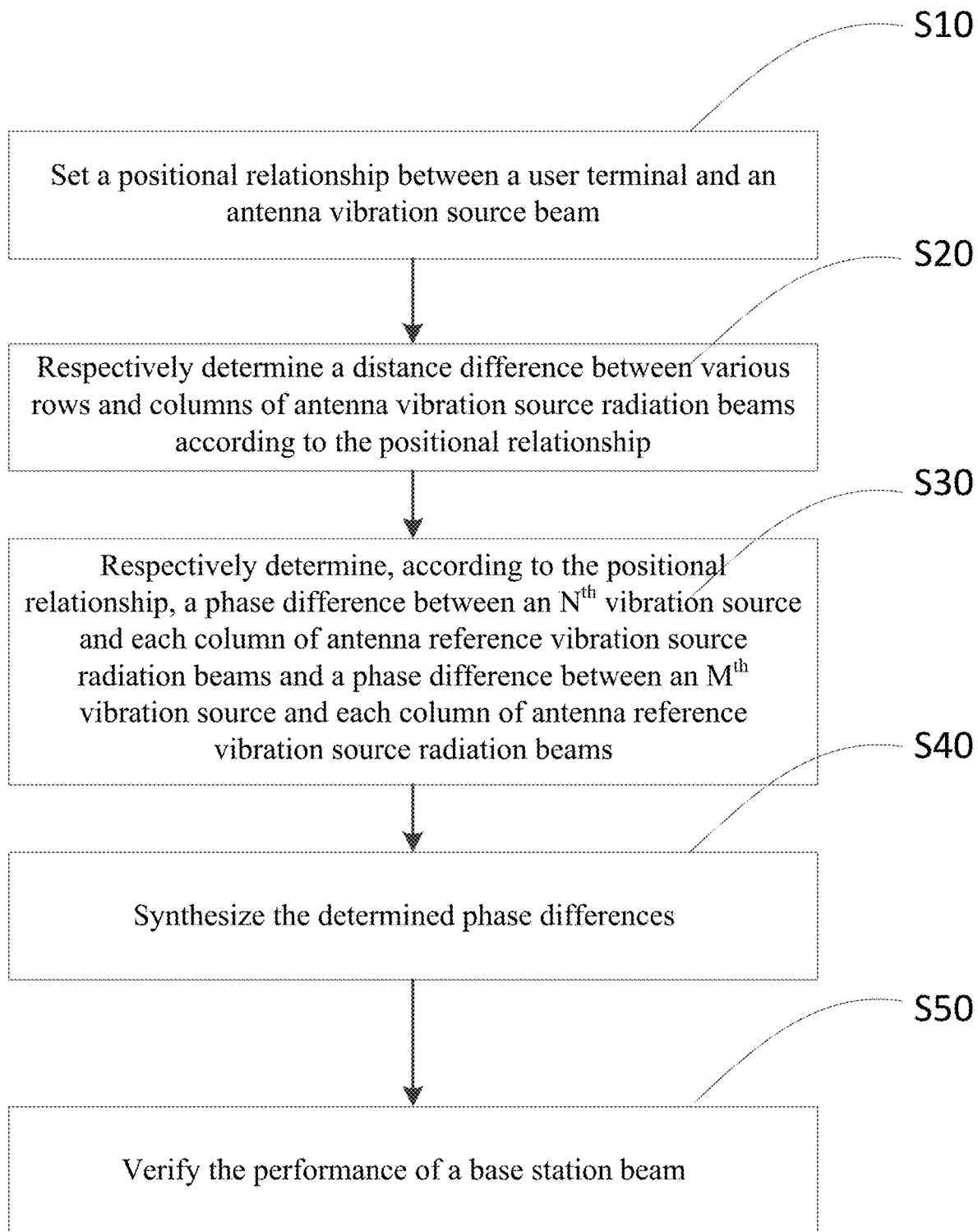
FIG. 6 is a flowchart of a base station test method based on 3D Massive MIMO in an embodiment of the present invention.

In a preferred embodiment of the present invention, the method flowchart is as shown in FIG. 6, and includes the steps of:

S10: setting a positional relationship between a user terminal and an antenna vibration source beam, and specifically, setting a horizontal angle θ and a vertical angle φ between the user terminal and the antenna vibration source beam propagation direction;

In the embodiments of the present invention, as shown in FIG. 4, based on location information of the terminal (an angle θ with a horizontal propagation direction, an angle φ perpendicular to the propagation direction and Z-axis distance information), and according to a principle and beamforming algorithm shown in FIG. 4 and FIG. 5, the corresponding beam directivity operation can be implemented, thereby implementing a Massive MIMO enhanced performance test scheme of a 4.5G/5G wireless communication base station.

The beamforming algorithm involves the following calculation formula.

The signal expression of a beamformed signal sent by the 4.5G/5G wireless communication base station is as follows:

$$y(t,\theta) = \Sigma_{n=1}^{N} x(t+(n-1)*\Delta t) \quad (1)$$

where $\Delta = d*\sin\theta$ $$\Delta t = \frac{\Delta}{c} = \Delta/(\lambda * f),$$

d is a vibration source spacing, c is a speed of light, f is a signal frequency, λ is a signal wavelength, t is a propagation time, and t is based on the rightmost vibration source; Δ is a propagation time difference; N is the same as N defined above.

As shown in FIG. 4, phased array antenna vibration sources are linearly arranged (the vibration source is n, n>1), and a radiation beam signal y(t, θ) may be calculated according to a phase difference between various vibration sources, as follows:

$$y(t, \theta) = \sum_{n=1}^{N} e^{j*2\pi ft} * e^{j*2\pi f*(n-1)*\frac{\Delta}{\lambda*f}} \quad (2)$$

A base station baseband signal expression $x(t) = e^{j*2\pi ft}$ is normalized to obtain:

$$y(t, \theta) = x(t) * \sum_{n=1}^{N} e^{j*\frac{2\pi}{\lambda} + d*\sin\theta*(n-1)} \quad (3)$$

Similarly, as shown in FIG. 5, in the figure, the upper end of an array is the front surface of the array, the lower end is the back of the array, n represents n columns of vibration sources, and m represents m rows of vibration sources; in a spherical coordinate system defined by the terminal, an antenna port of a 3D MIMO base station faces forward as a reference coordinate axis, the left side is m rows and n columns of antenna arrays of the 3D MIMO base station, and the right side is the terminal. A leftward angle of the coordinate axis along a horizontal plane is positive, e.g., θ degree in FIG. 5. An upward angle of the coordinate axis along a pitch direction is positive, e.g., φ degree in FIG. 5. Assume that the spacing of each column of vibration sources in a horizontal direction is D, and the spacing of each row of vibration sources in a vertical direction is L. A beam signal characterization radiated from an active phased array vibration plane can be calculated, as shown in FIG. 4;

If $\phi=0$ degree, a horizontal beam characterization is as follows:

$$y(t, \theta) = x(t) * \sum_{n=1}^{n} e^{j*\frac{2\pi}{\lambda}*D*\sin\theta*(n-1)} \quad (4)$$

If $\theta=0$ degree, a vertical beam characterization is as follows:

$$y(t, \phi) = x(t) * \sum_{m=1}^{m} e^{j*\frac{2\pi}{\lambda}*L*\sin\phi*(m-1)} \quad (5)$$

Figure 7:
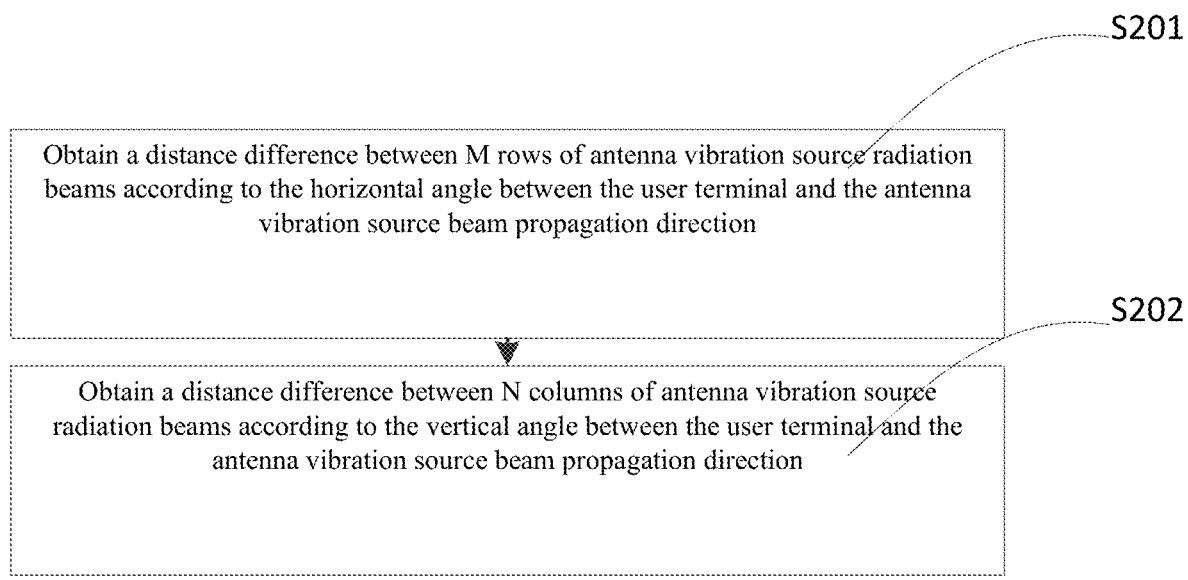
FIG. 7 is a flowchart of step S20 in an embodiment of the present invention.
Figure 8:
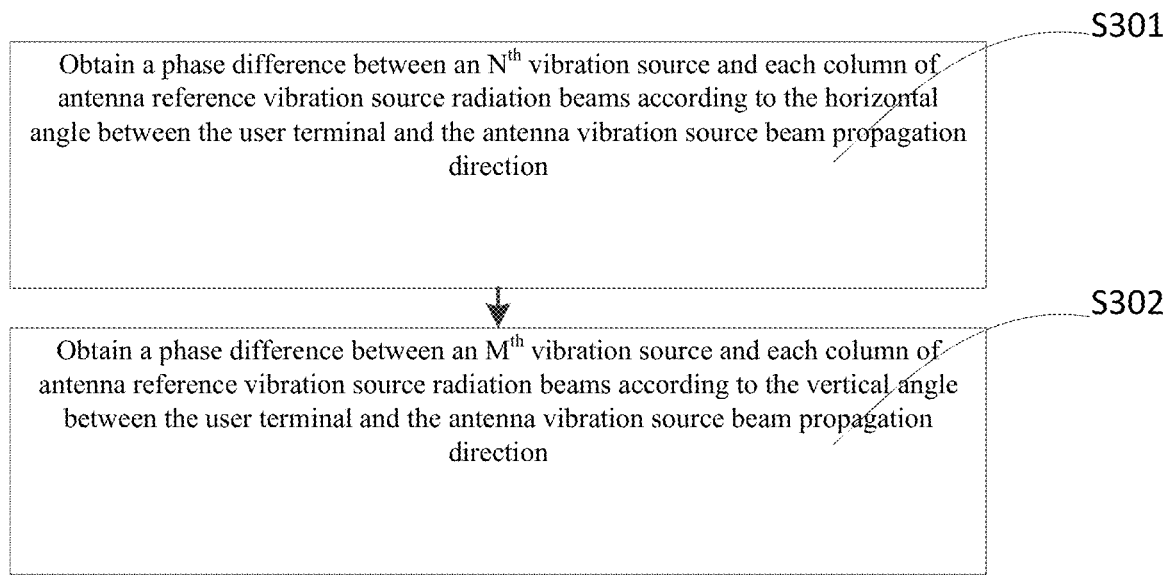
FIG. 8 is a flowchart of step S30 in an embodiment of the present invention.

S20: respectively determining a distance difference between various rows and columns of antenna vibration source radiation beams according to the positional relationship, as shown in FIG. 7, a specific flow including the steps of:

S201: obtaining a distance difference $\Delta=D*\sin\theta$ between M rows of antenna vibration source radiation beams according to the horizontal angle between the user terminal and the antenna vibration source beam propagation direction;

S202: obtaining a distance difference $\Delta=L*\sin\phi$ between N columns of antenna vibration source radiation beams according to the vertical angle between the user terminal and the antenna vibration source beam propagation direction;

S30: respectively determining, according to the positional relationship, a phase difference between an $N^{th}$ vibration source and each column of antenna reference vibration source radiation beams and a phase difference between an $M^{th}$ vibration source and each column of antenna reference vibration source radiation beams, as shown in FIG. 8, a specific flow including the steps of:

S301: obtaining a phase difference between an $N^{1h}$ vibration source and each column of antenna reference vibration source radiation beams according to the horizontal angle between the user terminal and the antenna vibration source beam propagation direction;

If $\phi=0$, a test system channel phase value as shown in FIG. 5 is correspondingly set, and a phase difference between n columns in the horizontal direction is as follows:

$$H(\theta) = \frac{2\pi}{\lambda} * D * \sin\theta * (n-1) \quad (6)$$

S302: obtaining a phase difference between an $M^{th}$ vibration source and each column of antenna reference vibration source radiation beams according to the vertical angle between the user terminal and the antenna vibration source beam propagation direction.

If $\theta=0$, a test system channel phase value as shown in FIG. 5 is correspondingly set, and an offset of m rows in the vertical direction is as follows:

$$V(\phi) = \frac{2\pi}{\lambda} * L * \sin\phi * (m-1) \quad (7)$$

Figure 9:
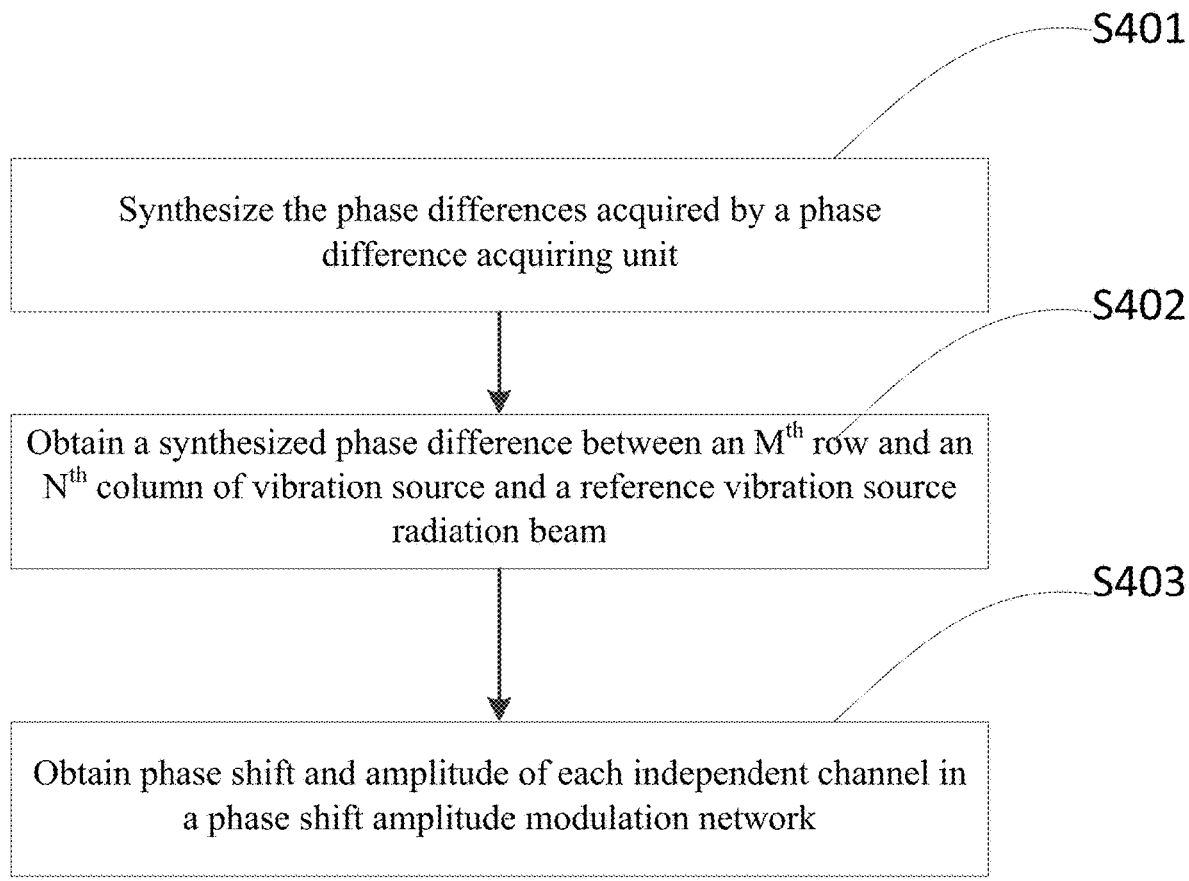
FIG. 9 is a flowchart of step S40 in an embodiment of the present invention.

S40: synthesizing the determined phase differences, as shown in FIG. 9, a specific flow including the steps of:

S401: synthesizing the phase differences acquired by a phase difference acquiring unit.

$$P(\theta,\phi)=H(\theta)+V(\phi) \quad (8)$$

S402: obtaining a synthesized phase difference between an $M^{th}$ row and an $N^{th}$ column of vibration source and a reference vibration source radiation beam;

The horizontal angle $\theta$ and the vertical angle $\phi$ are comprehensively considered, and for m rows and n columns of signal beams, the final composite beam characterization is as follows:

$$y(t, \theta, \phi) = x(t) * \sum_{\substack{n=1 \\ m=1}}^{n,m} e^{j*\frac{2\pi}{\lambda}*[D*\sin\theta*(n-1)+L*\sin\phi*(m-1)]} \quad (9)$$

S403: obtaining phase shift values of each independent channel in a phase shift amplitude modulation network:

$$\left(\frac{2\pi}{\lambda} * D * \sin\theta * (n-1)\right) \text{ and } \frac{2\pi}{\lambda} * L * \sin\theta * (m-1);$$

S50: verifying the performance of a base station beam.

Specifically, according to a base station beamforming algorithm, the location information and setting information of the terminal side are compared to complete the verification of the base station beam tracking performance.

The present invention also provides a computer-readable storage medium, storing an application program of a base station test method based on 3D Massive MIMO, the application program implementing the steps of the base station test method based on 3D Massive MIMO as described above.

In the embodiments of the present invention, the data processing device has a built-in processor, and may be composed of an integrated circuit, for example, may be composed of a single packaged integrated circuit, or may be composed of multiple integrated circuits with the same function or different functions, including one or more Central Processing Units (CPUs), microprocessors, digital processing chips, graphics processors, and combinations of various control chips. The processor uses various interface and line connections to access various components to perform various functions and process data of base station testing based on 3D Massive MIMO by running or executing programs or units stored in a memory and invoking data stored in the memory.

The memory is configured to store program codes and various data, is installed in the built-in processor of the data processing device, and achieves high-speed and automatic program or data access during operation. The memory includes a Read-Only Memory (ROM), a Random Access Memory (RAM), a Programmable Read-Only Memory (PROM), an Erasable Programmable Read-Only Memory (EPROM), a One-Time Programmable Read-Only Memory (OTPROM), an Electronically-Erasable Programmable Read-Only Memory (EEPROM), a Compact Disc Read-Only Memory (CD-ROM) or other optical disk storage, magnetic disk storage, magnetic tape storage, or any other computer-readable media that can be used to carry or store data.

The above description is only a preferred embodiment of the present invention, and is not intended to limit the patent scope of the present invention. Any equivalent structural transformations made by using the description and drawings of the present invention under the inventive concept of the present invention or direct/indirect applications in other related technical fields are included within the scope of patent protection of the present invention.

The invention claimed is:

1. A base station test system based on 3D Massive MIMO, comprising a phase shift amplitude modulation network provided with M×N independent channels, M 3D MIMO base stations, N user terminals and a data processing device, wherein an input end of the phase shift amplitude modulation network is connected to the M 3D MIMO base stations, an output end of the phase shift amplitude modulation network is connected to the N user terminals, and the phase shift and amplitude of each independent channel in the phase shift amplitude modulation network are independently controllable; and the data processing device is configured to acquire a phase shift variation and an amplitude variation of each independent channel of the phase shift amplitude modulation network according to a positional relationship between a user terminal and an antenna vibration source beam propagation direction, and verify a base station beam performance according to the phase shift variation and the amplitude variation, wherein the data processing device comprises a setting unit, a distance difference acquiring unit, a phase difference acquiring unit, and a synthesis unit the setting unit is configured to set a positional relationship between a user terminal and an antenna vibration source beam propagation direction;

the distance difference acquiring unit is configured to respectively determine a distance difference between various rows and columns of antenna vibration source radiation beams according to the positional relationship;

the phase difference acquiring unit is configured to respectively determine, according to the positional relationship, a phase difference between an Nth vibration source and each column of antenna reference vibration source radiation beams and a phase difference between an Mth vibration source and each column of antenna reference vibration source radiation beams; and the synthesis unit is configured to synthesize the phase differences acquired by the phase difference acquiring unit.

2. The base station test system based on 3D Massive MIMO according to claim 1, wherein the phase shift amplitude modulation network provided with M×N independent channels comprises a plurality of power dividers, a plurality of digital step attenuators and a plurality of phase shifters; and the input end of the phase shift amplitude modulation network is internally provided with M power dividers for dividing input signals, the output end of the phase shift amplitude modulation network is internally provided with N power dividers for synthesizing output signals, M×N independent channels are formed between the power divider of the input end and the power divider of the output end, and each independent channel is connected in series with a digital step attenuator for controlling the amplitude of the channel and a phase shifter for controlling the phase of the channel.

3. The base station test system based on 3D Massive MIMO according to claim 1, wherein the positional relationship between a user terminal and an antenna vibration source beam comprises a horizontal angle and a vertical angle between the user terminal and the antenna vibration source beam propagation direction.

4. The base station test system based on 3D Massive MIMO according to claim 1, wherein the operation of respectively determining a distance difference between various rows and columns of antenna vibration source radiation beams according to the positional relationship specifically comprises: obtaining a distance difference between M rows of antenna vibration source radiation beams according to the horizontal angle between the user terminal and the antenna vibration source beam propagation direction, and obtaining a distance difference between N columns of antenna vibration source radiation beams according to the vertical angle between the user terminal and the antenna vibration source beam propagation direction.

5. The base station test system based on 3D Massive MIMO according to claim 1, wherein the operation of respectively determining, according to the positional relationship, a phase difference between an Nth vibration source and each column of antenna reference vibration source radiation beams and a phase difference between an Mth vibration source and each column of antenna reference vibration source radiation beams specifically comprises: obtaining a phase difference between an Nth vibration source and each column of antenna reference vibration source radiation beams according to the horizontal angle between the user terminal and the antenna vibration source beam propagation direction, and obtaining a phase difference between an Mth vibration source and each column of antenna reference vibration source radiation beams according to the vertical angle between the user terminal and the antenna vibration source beam propagation direction.

6. The base station test system based on 3D Massive MIMO according to claim 1, wherein the operation of synthesizing the phase differences acquired by the phase difference acquiring unit specifically comprises: synthesizing the phase differences acquired by the phase difference acquiring unit to obtain a synthesized phase difference between an Mth row and an Nth column of vibration source and a reference vibration source radiation beam, that is, to obtain the phase shift and amplitude of each independent channel in the phase shift amplitude modulation network.

* * * * *